United States Patent [19]

Fohl

[11] 4,129,380
[45] Dec. 12, 1978

[54] COPY APPARATUS USING CHEMICAL FLASHLAMP

[75] Inventor: Timothy Fohl, Carlisle, Mass.

[73] Assignee: GTE Sylvania Incorporated, Danvers, Mass.

[21] Appl. No.: 796,795

[22] Filed: May 13, 1977

[51] Int. Cl.² .................. G03B 27/30; G03B 27/04
[52] U.S. Cl. ................................ 355/113; 355/100
[58] Field of Search .................. 431/93–95; 240/1.3; 354/135, 142; 355/100, 113, 84

[56] References Cited

U.S. PATENT DOCUMENTS

| | | | |
|---|---|---|---|
| 2,301,675 | 11/1942 | Arndt | 355/100 |
| 2,726,317 | 12/1955 | Rogers | 355/84 X |
| 3,173,746 | 3/1965 | Rockmore | 355/113 X |
| 3,358,476 | 12/1967 | Buzalski | 240/1.3 X |
| 3,528,354 | 9/1970 | Nakagawa et al. | 431/95 X |
| 3,584,554 | 6/1971 | Hochreiter | 431/95 |
| 3,665,176 | 5/1972 | Shaffer et al. | 431/93 X |
| 3,776,686 | 12/1973 | Anderson et al. | 240/1.3 X |
| 3,904,292 | 9/1975 | Ravich | 355/100 |
| 4,008,040 | 2/1977 | Murray et al. | 431/94 |

Primary Examiner—Donald A. Griffin
Attorney, Agent, or Firm—James Theodosopoulos

[57] ABSTRACT

A portable low-cost copier comprises a housing having a bottom surface at which a photosensitized sheet and an original can be disposed. Disposed within the housing is a chemical flashlamp which is ignited to make the copy.

6 Claims, 3 Drawing Figures

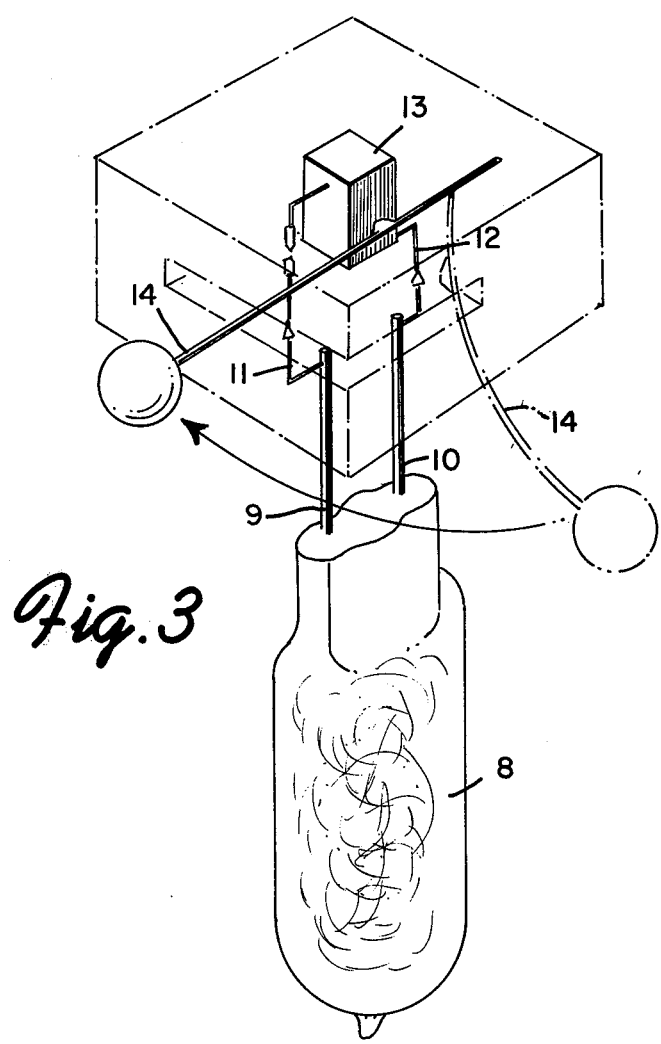

COPY APPARATUS USING CHEMICAL FLASHLAMP

THE INVENTION

This invention is concerned with portable low cost copying apparatus of the type that uses a flashlamp that emits a pulse of radiant energy. An example of such a copier is shown in U.S. Pat. No. 3,904,292. The lamps used in such copiers are generally xenon flashlamps. In low cost copiers using xenon flashlamps, the light output thereof can vary considerably, because the light output is a function of the charge on the capacitor which powers the lamp. And the pilot lamp which indicates that the capacitor is adequately charged to flash the xenon lamp, lights up at less than a 100% charge, as low as, say, 60 to 80%. Thus the amount of light can vary considerably from flash to flash.

It is an object of this invention to provide a portable low cost copier which substantially alleviates the problem of nonuniform light output from flash to flash.

In this invention the source of pulse illumination is provided by a lamp of the chemical flash type within the housing of a copier. A chemical flashlamp comprises a sealed glass envelope containing a combustible material and a combustion supporting gas, for example, oxygen, and having ignition means for igniting the combustible material. The combustible material is usually a metal foil, for example, zirconium, in ribbon or shredded form loosely arranged inside the envelope. The light output of such lamps is more uniform, from flash to flash, than the light output of a xenon flashlamp in a low cost copier.

In the drawing,

FIG. 2 and FIG. 3 show two embodiments of chemical flashlamps that can be used with this invention.

The copier comprises an enclosure 1 having a bottom surface 2. Disposed within the top part of enclosure 1 is a chemical flashlamp 3 the radiant output of which is directed toward surface 2. The copier also has a means 4 for activating flashlamp 3.

The copier may be used either with the direct method or reflex method of contact copying. In the direct method, a suitable photosensitized sheet is placed on surface 2 and the sheet to be copied, that is to say, the original, is placed on the photosensitized sheet. When flashlamp 3 is flashed, the radiant energy passes through the original onto the photosensitized sheet. In the reflex method of copying, the original is placed on surface 2 and the photosensitized sheet is placed on top of the original. Surface 2 may also be a transparent platen, and the photosensitized sheet and original may be placed outside enclosure 1 parallel to, or in contact with, the platen, in line of sight with flashlamp 3. Examples of suitable photosensitive materials that can be used are shown in U.S. Pat. Nos. 3,811,773; 3,740,220 3,515,552 and 3,121,162.

Figure 1:
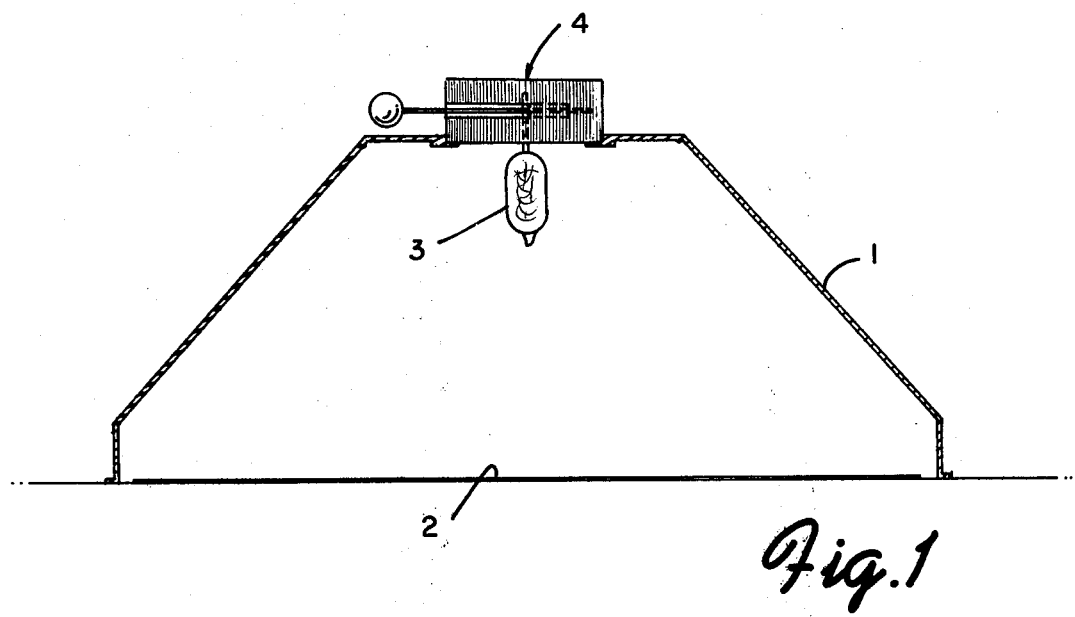
FIG. 1 is a sectional view of a copier in accordance with this invention.
Figure 2:
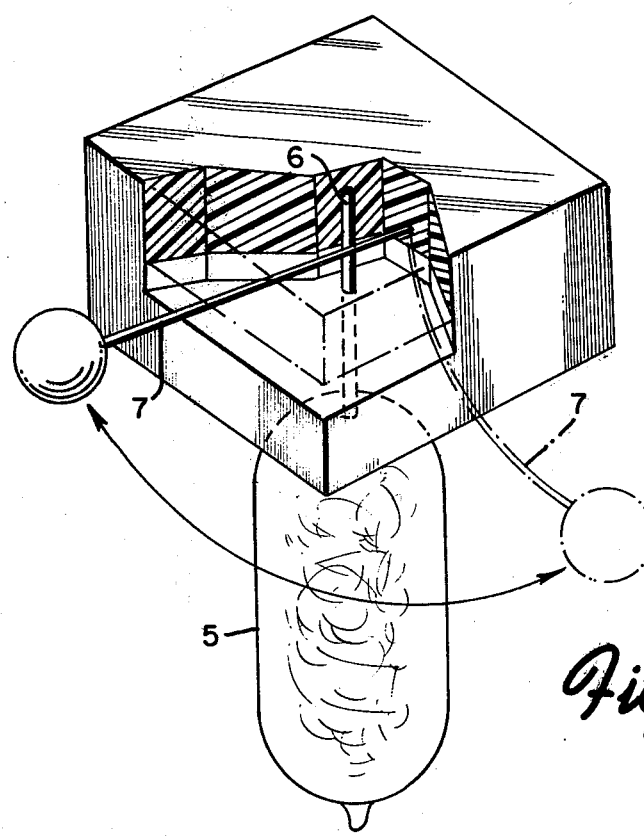

One example of a chemical flashlamp that can be used is shown in U.S. Pat. No. 3,730,669 the disclosure of which is incorporated herein by reference. As shown in FIG. 2, percussively ignited flashlamp 5 has a primer tube 6 extending therefrom. The lamp is mechanically ignited by deflecting and then releasing lamp-striker spring 7, which strikes tube 6 and percussively ignites flashlamp 5.

FIG. 3 shows another type of chemical flashlamp that can be used. Such a flashlamp is ignited by a high voltage pulse from a piezoelectric crystal, as disclosed in U.S. Pat. No. 4,008,040 the disclosure of which is incorporated herein by reference. Flashlamp 8 has lead-in wires 9 and 10 extending therefrom which are connected by connector wires 11 and 12 to opposite faces of piezoelectric crystal 13. When crystal 13 is struck by lamp-striker spring 14, a high voltage pulse is generated which is conducted into flashlamp 8 by means of lead-in wires 9 and 10 and ignites the flashlamp.

A test on the uniformity of light output of chemical flashlamps in accordance with this invention showed a variation of only about plus or minus 10%. In comparison, the variation of light output of low cost xenon flashlamps is much greater, as much as plus or minus 25%.

I claim:

1. In a low cost portable copier of the type having a housing and a bottom surface at which a photosensitized sheet and an original can be disposed, and a pulse type flashlamp disposed within the housing so that radiant energy therefrom can be directed toward the photosensitized sheet and original, the improvement which comprises said flashlamp being a chemical flashlamp containing a combustible material and a combustion supporting means, and the copier having ignition means for flashing the flashlamp, said ignition means comprising a mechanically actuated lamp-striker spring which can be deflected and then released to ignite the flashlamp.

2. The copier of claim 1 wherein said flashlamp has a primer tube extending therefrom.

3. The copier of claim 2 wherein the ignition means is adapted to mechanically strike said primer tube.

4. The copier of claim 1 wherein said flashlamp has two lead-in wires extending therefrom.

5. The copier of claim 4 wherein the ignition means includes a piezoelectric crystal.

6. The copier of claim 5 wherein the ignition means also includes a striker adapted to strike the piezoelectric crystal which can deliver a high voltage pulse to, and thereby ignite, the flashlamp.

* * * * *